(12) United States Patent
Fries et al.

(10) Patent No.: US 7,134,134 B2
(45) Date of Patent: Nov. 7, 2006

(54) ELECTRONIC PROGRAM GUIDE HARDWARE CARD

(75) Inventors: Robert M. Fries, Redmond, WA (US); Michael E. Pietraszak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 847 days.

(21) Appl. No.: 09/681,354

(22) Filed: Mar. 24, 2001

(65) Prior Publication Data

US 2002/0138837 A1 Sep. 26, 2002

(51) Int. Cl.
*G06F 3/00* (2006.01)

(52) U.S. Cl. .................. 725/50; 725/5; 725/6; 725/48; 725/55; 725/133; 725/141; 725/153; 380/201; 380/202; 380/211; 380/231; 380/232; 348/714; 348/734; 711/115; 235/380; 235/381; 235/382; 235/61 P; 235/61 PJ; 713/172; 713/185; 705/51; 705/52; 705/53; 705/54; 705/55; 705/57; 705/58; 705/59

(58) Field of Classification Search .................. 725/6, 725/48, 50, 55, 133, 141, 153, 5; 380/201, 380/202, 211, 231, 232; 705/51–55, 57–59; 713/172, 185; 235/380–382, 61 PD, 61 PJ; 711/115; 348/714, 734
See application file for complete search history.

(56) References Cited

U.S. PATENT DOCUMENTS

| | | | | |
|---|---|---|---|---|
| 5,397,571 A | * | 3/1995 | Roland et al. | 424/405 |
| 5,481,609 A | * | 1/1996 | Cohen et al. | 380/227 |
| 5,734,589 A | * | 3/1998 | Kostreski et al. | 715/716 |
| 5,835,864 A | * | 11/1998 | Diehl et al. | 725/140 |
| 5,852,290 A | * | 12/1998 | Chaney | 235/492 |
| 5,923,759 A | * | 7/1999 | Lee | 713/159 |
| 5,987,612 A | * | 11/1999 | Takagawa et al. | 713/201 |
| 6,014,748 A | * | 1/2000 | Tushie et al. | 726/9 |
| 6,055,314 A | * | 4/2000 | Spies et al. | 380/228 |
| 6,405,369 B1 | * | 6/2002 | Tsuria | 725/6 |
| 6,424,947 B1 | * | 7/2002 | Tsuria et al. | 705/1 |
| 6,452,616 B1 | * | 9/2002 | De Vito et al. | 715/825 |
| 6,487,723 B1 | * | 11/2002 | MacInnis | 725/132 |
| 6,594,361 B1 | * | 7/2003 | Chaney et al. | 380/221 |
| 6,615,254 B1 | * | 9/2003 | Takemoto | 709/219 |

(Continued)

FOREIGN PATENT DOCUMENTS

FR        EP0914001 A1 * 10/1997

(Continued)

OTHER PUBLICATIONS

Forrester, Can Sleepy Set- Top Boxes Ever Be Sexy?, Fall 1999, TBS, pp. 1-3.*

(Continued)

*Primary Examiner*—Jason P. Salce
(74) *Attorney, Agent, or Firm*—Workman Nydegger

(57) ABSTRACT

An electronic program guide (EPG) hardware card is disclosed. The card is insertable into a television tuning device having EPG capability. A non-volatile memory, such as flash memory, is situated within a case of the hardware card, and has data stored thereon representing one or more loader programs for the device. Each program corresponds to an EPG provider, and gives the device the capability to receive EPG information from this provider. The case of the hardware card may have a form factor such as a Smart Card, a Compact Flash, a Smart Media, or another form factor. Alternatively, the data stored on the card represents non-executable information corresponding to an EPG provider. A business model and a server-based embodiment are also disclosed.

35 Claims, 9 Drawing Sheets

U.S. PATENT DOCUMENTS

| | | | |
|---|---|---|---|
| 6,714,650 B1 * | 3/2004 | Maillard et al. | 380/231 |
| 6,738,047 B1 * | 5/2004 | Kobayashi | 345/172 |
| 6,754,904 B1 * | 6/2004 | Cooper et al. | 725/32 |
| 6,813,639 B1 * | 11/2004 | Nobakht et al. | 709/227 |
| 7,003,500 B1 * | 2/2006 | Driessen | 705/74 |
| 2001/0005901 A1 * | 6/2001 | Kamperman et al. | 725/40 |
| 2001/0037502 A1 * | 11/2001 | Kamemoto et al. | 725/55 |
| 2002/0007488 A1 * | 1/2002 | Kikinis et al. | 725/40 |
| 2002/0010932 A1 * | 1/2002 | Nguyen et al. | 725/51 |
| 2002/0029347 A1 * | 3/2002 | Edelman | 713/193 |
| 2002/0044656 A1 * | 4/2002 | Lee | 380/201 |
| 2002/0087968 A1 * | 7/2002 | Krishnan et al. | 705/27 |
| 2002/0133413 A1 * | 9/2002 | Chang et al. | 705/26 |
| 2003/0093812 A1 * | 5/2003 | Chang et al. | 725/133 |
| 2003/0105679 A1 * | 6/2003 | Krishnan et al. | 705/27 |

FOREIGN PATENT DOCUMENTS

WO      WO9935849    *   7/1999

OTHER PUBLICATIONS

U.S Department of Justice, Undercover Customs Operation Results in Charges and Pleas in Connection with Stolen Satellite Television, Aug. 8, 2000, U.S. Department of Justice, pp. 1-2.* www.dictionary.com, definition for "vendor", 2000, Houghton Mifflin Company, p. 1.* www.dictionary.com, definition for "vends", 2000, Houghton Mifflin Company, p. 1.* www.dictionary.com, definition for "non-volatile storage", May 22, 2000, The Free On-line Dictionary of Computing.*

Microsoft Computer Dictionary, Fourth Edition, definition of "set-top box", 1999, Microsoft Press, p. 405.*

* cited by examiner

FIG 2
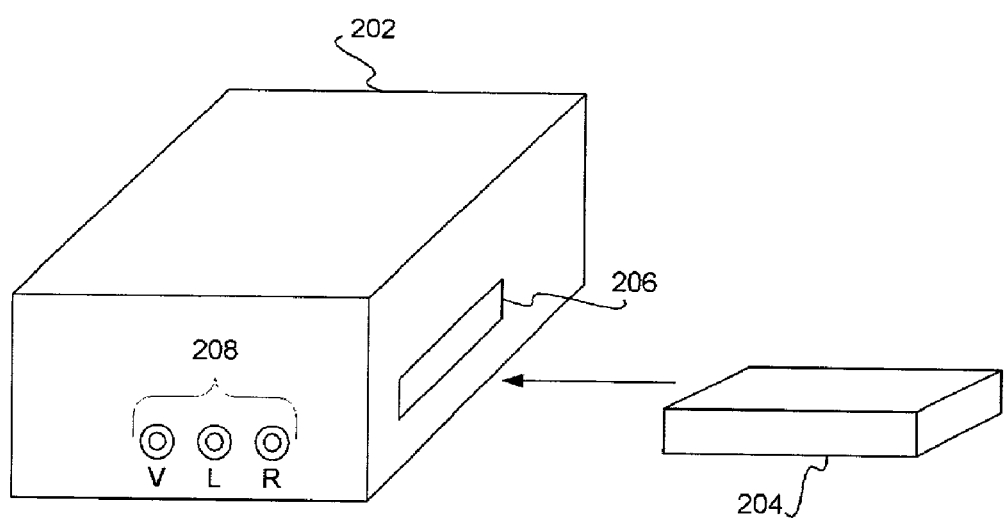

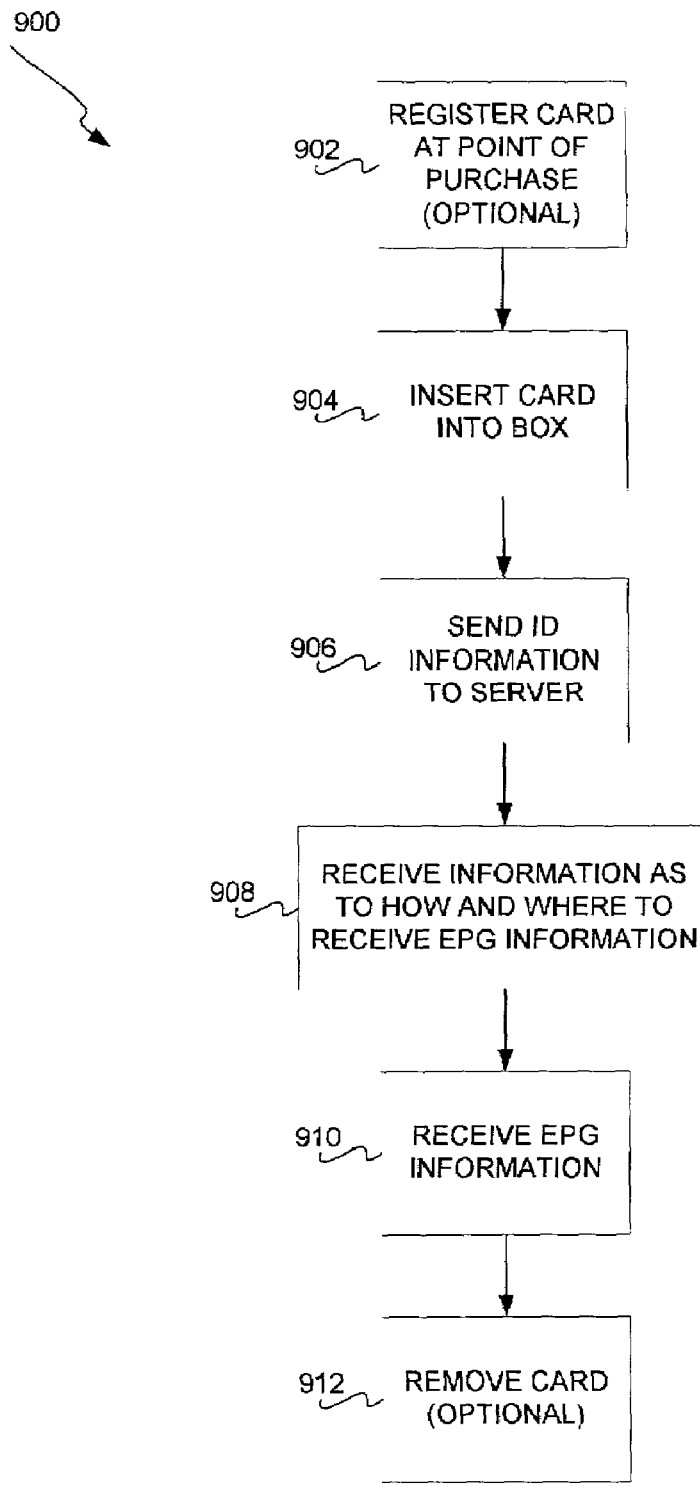

ELECTRONIC PROGRAM GUIDE HARDWARE CARD

BACKGROUND OF THE INVENTION

This invention relates generally to electronic program guides (EPG's), and more specifically to such EPG's that have data corresponding thereto stored on a hardware card.

Currently, most television (TV) viewers use one of two ways to obtain TV program information: channel surfing, or using printed program guides. The former entails the viewer switching from channel to channel to obtain an overview of the programs that are currently running. The latter entails the viewer studying paper guides that include descriptions and indices to TV programs in order to obtain TV program information. However, with the increasing number of TV channels offered, both of these approaches become less practical.

To this end, electronic program guides (EPG's) have become more popular, and are predicted to become more commonplace with the increasing selection of TV channels. EPG's are also known as interactive program guides (IPG's). EPG's allow viewers to see program information on their TV screens. They can view an index of shows over all channels within a given time period, or see detailed information on a particular TV program. Viewers do not have to refer to a printed program guide, nor channel surf, to learn of the programs currently on TV. As used in this invention, an EPG refers to television program information that is displayed on a TV screen or other display such that the user can reference such information without consultation to a printed guide. Typically, but not necessarily, such television program information is received electronically.

Currently, a user is locked into a particular EPG provider depending on the manner by which the user receives TV services. For example, a cable TV operator, a Digital Satellite System (DSS) TV provider, or a Digital TV (DTV) provider usually gives subscribers a television tuning device, such as a set-top box, that is hard-coded to a particular EPG provider. The subscriber has no way to switch EPG providers. Each provider typically supplies and encodes its EPG information in a different manner. While most EPG's provide the same basic information, some EPG's provide better information on certain types of programming, such as movies, sports, news, and the like.

For these and other reasons, there is a need for the present invention.

SUMMARY OF THE INVENTION

The invention relates to an EPG hardware card. The hardware card is insertable into a television tuning device having EPG capability. A non-volatile memory, such as flash memory, is situated within the case of the hardware card, and has data stored thereon representing one or more loader programs for the television tuning device. Each loader program corresponds to an EPG provider, and gives the television tuning device the capability to receive EPG information from this provider. The case of the hardware card may have a form factor such as a Smart Card, a Compact Flash, a Smart Media, or another form factor. Alternatively, the data stored on the non-volatile memory does not represent any executable code, but rather represents information necessary to receive EPG information from an EPG provider.

The program or data on the EPG hardware card specifies which delivery transports, such as vertical blank interrupt (VBI), the Internet, and so on, should be used when retrieving the EPG information from a provider. The EPG hardware card can also specify how this EPG information is to be retrieved from the provider.

Embodiments of the invention provide advantages over the prior art. A user is not locked into a given EPG provider. Rather, the user can switch EPG providers by acquiring EPG hardware cards for desired EPG providers. For example, a user wanting more detailed sports programming information may acquire a card for an EPG provider that provides such detailed sports EPG information, while a user wanting more detailed movie information may acquire a different card for a different EPG provider that provides better movie information. Generally, although not necessarily, the user may also have to subscribe to the EPG information service provided by the EPG provider for which he or she has a corresponding EPG card.

The invention creates a new business market for EPG information. For example, a consumer may be able to visit a retail store, or other point-of-sale (POS), and purchase a desired EPG card. Different companies can market different cards at different price points, and that provide different features. A premium EPG card may have extensive listings and cost more than a basic EPG card that only has rudimentary program information. Specialized EPG cards may also be produced, that cater to movie fans, sports fans, and other types of fans. A retail store may also sign an agreement with an EPG provider to exclusively sell the provider's cards at the store. A set-top box may be packaged with a particular type of card as a promotion.

In another embodiment, the EPG card is only temporarily inserted into the set-top box to program the box to receive the listings associated with the card, and then is removed. That is, the card is inserted into the box to transfer a program into the box, and then the card is removed. The box is then programmed to receive listings associated with the card. As a result, a store clerk may perform this box programming for the consumer. The consumer indicates the type of card he or she wants to buy, and then the clerk inserts this card into the box, programs the box, and removes the card. In this embodiment, the consumer is in effect buying the programming on the card, but does not retain physical possession of the card. In either this embodiment or the embodiment in which the consumer does retain physical possession of the EPG card, a competitive market for EPG providers is created by the invention.

The invention includes hardware cards, methods, and television tuning devices of varying scope. Other aspects, embodiments and advantages of the invention, beyond those described here, will become apparent by reading the detailed description and with reference to the drawings.

BRIEF DESCRIPTION OF THE DRAWINGS

FIG. 2 is a diagram of a system according to an embodiment of the invention.

FIG. 9 is a flowchart of a method of the server-based embodiment of FIG. 8.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the present invention is defined only by the appended claims.

Operating Environment

Figure 1:
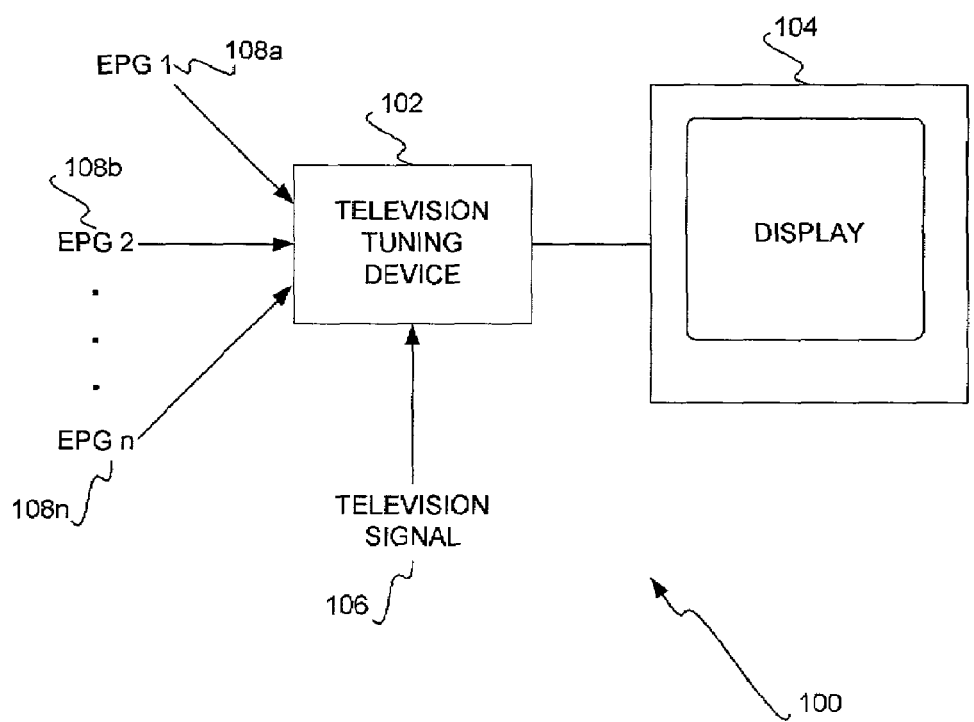
FIG. 1 is a diagram of an example operating environment of an embodiment of the invention.

In this section of the detailed description, an example operating environment for an embodiment of the invention is described. In the diagram of FIG. 1, an environment 100 is shown that includes a television tuning device 102 and a display 104. As used in the invention, a television tuning device is a device that is able to translate an incoming signal 106 into a picture, typically with accompanying sound, for viewing on a TV screen or other display 104. Such a device may be integrated into a TV itself, where such a TV may receive Very High Frequency (VHF) channels, Ultra High Frequency (UHF) channels, and cable TV channels (such that the TV is "cable ready"). The device 102 may be a set-top box that is situated between the TV or other display 104 and the signal 106. The device 102 may be a general purpose computer having software and/or hardware running thereon to translate the incoming signal 106 for viewing on a TV or other display 104. The display 104 is a display on which the picture generated by the device 102 is shown, and can be a television, a computer monitor, a cathode ray tube (CRT) device, a flat-panel display (FPD) device, or another type of device.

The device 102 is able to receive electronic program guide (EPG) information from one or more EPG providers 108a, 108b, . . . , 108n. As used in the invention, an EPG refers to television program information that is displayed on a TV screen or other display 104 such that the user can reference such information without consultation to a printed guide. Typically, but not necessarily, such television program information is received electronically. The EPG providers 108 can transmit EPG information to the device 102 in varying manners, and the invention itself is not particularly limited to a given manner or manners. For example, the transmission can occur over a network, such as one or more of a local-area network (LAN), a wide-area network (WAN), an intranet, an extranet, and the Internet. The transmission can also occur through a dial-up modem. The transmission can occur within the signal 106 itself, such that the EPG information is transmitted in-band or out-of-band relative to the signal 106, or within the vertical blanking interrupt (VBI) of the signal 106. Each of these examples is referred to as a network over which EPG information is received.

Similarly, the incoming signal 106 can be received in a variety of different manners, such as via cable TV (CATV), an off-air antenna for traditional TV stations, a Digital Satellite System (DSS) satellite, a digital TV signal (DTV), and over a network.

EPG Hardware Card for a Television Tuning Device

In this section of the detailed description, an EPG hardware card for a television tuning device is described. The hardware card generally provides for the device to be able to receive EPG information from one or more EPG providers of the card, such as the EPG providers 108 of FIG. 1 as has been described in the previous section. The hardware card accomplishes this in one embodiment by having a loader program for each of its EPG providers, which loads information into the television tuning device to allow for reception of the EPG information from these providers for example, the program providing the manner by which encoded EPG information from a specified network is to be decoded.

In FIG. 2, a diagram of a system 200 of an embodiment of the invention is shown as including a television tuning device 202 and a hardware card 204. The device 202 has a slot 206 into which the card 204 is insertable. The exterior case of the card 204 has a form factor, such as that of a Smart Card, a PCMCIA Card (also referred to as a PC Card), a Compact Flash Card, or a Smart Media card, among others, that corresponds to the form factor of the slot 206. The device 202 also has a number of connections 208 that enable the device 202 to be communicatively coupled to a display such as a TV. For example, the connections 208 may include a video connection, a left channel audio connection, and a right channel audio connection. The video connection can be an RCA jack for composite video, a BNC coaxial connector for composite video, a set of RCA jacks or BNC coaxial connectors for component video, an S-VHS connector, an RGB connector, or another type of connector.

Figure 3:
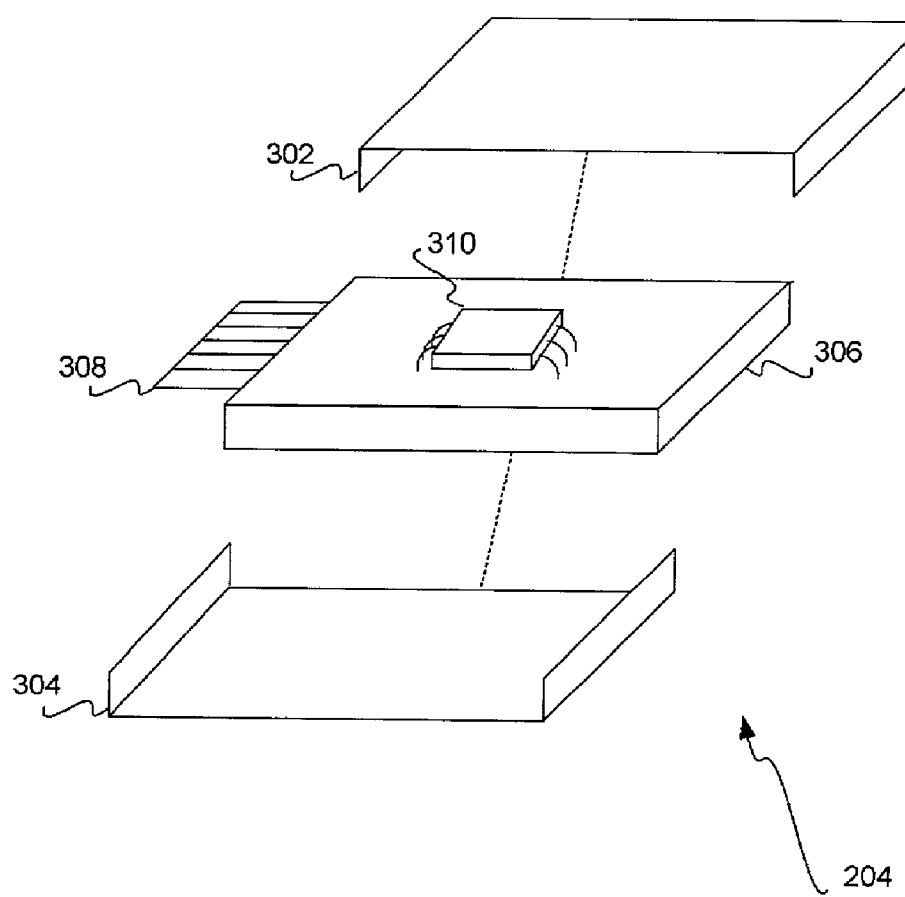
FIG. 3 is a diagram of an exploded view of a hardware card of an embodiment of the invention.

An exploded view of the card 204 in one embodiment of the invention is shown in the diagram of FIG. 3. The exterior (or, outer) case of the card 204 has as shown in FIG. 3 a top part 302 and a bottom part 304, which encase a circuit board 306 having a connector 308 that plugs into a corresponding connector of the television tuning device. Desirably, the card 204 has a non-volatile memory 310, such as a flash memory, on which data is stored that provides the functionality for the card 204 as described in this application. It is noted that the card 204 as explicitly shown in FIG. 3 is an example only, and does not represent a limitation of the invention itself.

Figure 5:
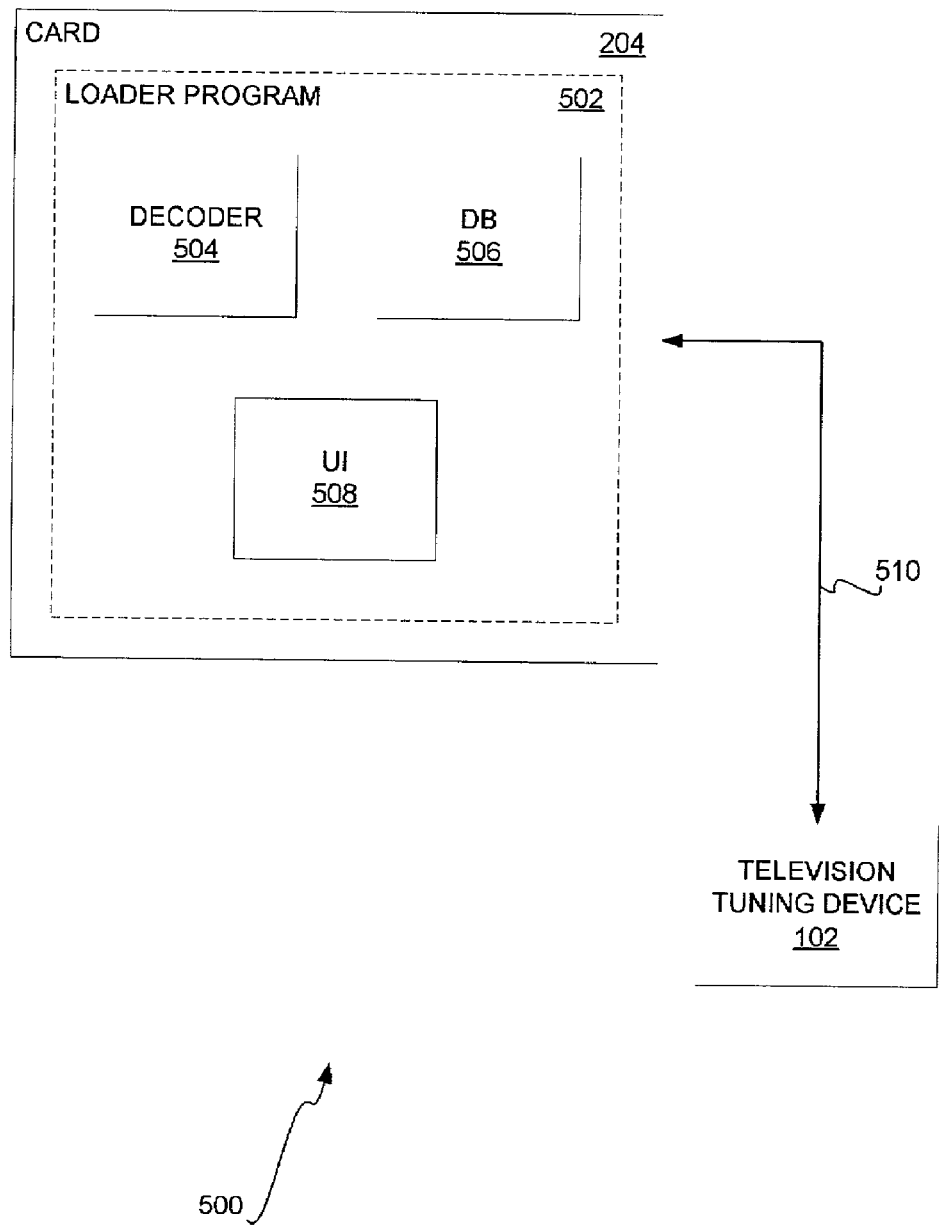
FIG. 5 is a diagram of a system showing what is stored on a hardware card in one embodiment of the invention.

As shown in the diagram 500 of FIG. 5, in one embodiment the data stored on the memory 310 of the card 204 represents one or more loader programs 502, where each loader program 502 has a corresponding EPG provider. The card 204 is inserted into the television tuning device 102, which is represented by the arrow 510 in FIG. 5. Each loader program 502 is designed to decode encoded EPG information from its corresponding provider over a specified transmission network. There is only one program 502 shown in FIG. 5 for illustrative clarity. As an example, a given card may have one loader program 502, corresponding to a "Company A" EPG provider that transmits its encoded EPG information over the Internet. Thus, this loader program 502 is designed to decode the encoded EPG information from the "Company A" EPG provider over the Internet, so that a user can view the EPG information on the display communicatively coupled to the television tuning device in which the card has been inserted.

In one embodiment, each loader program 502 of the card 204 has one or more of at least three different program segments, or parts, where each segment includes executable computer program instructions. First, a decoder segment 504 of the loader program 502 decodes the encoded EPG information from the EPG provider to which the program 502 corresponds. Desirably, the decoder segment 504 includes specification of the transmission network over which the encoded EPG information is received from the EPG provider, such as over-the-air, over the Internet, or another type of transmission network. For example, the specification may include the Universal Resource Locator (URL) address on the Internet at which the EPG information can be accessed. The specification may include a specific channel or frequency that the television tuning device 102 should tune to receive the encoded EPG information. The specification may also include how the encoded EPG information can be decoded. As an example, the specification may include the keys by which the EPG information can be decoded.

Second, there is a database segment 506 to transfer the loader program 502 into the television tuning device 102, such as a database thereof meant to store such programs and possibly other information. The database segment 506 allows the loader program 502 to be stored in the device itself, so that the card 204 can subsequently be removed from the device after the loader program 502 has been transferred into the device.

Third, there is a user interface segment 508 that provides displayed instructions to the user as to what the user must do to load the loader program 502 into the device, or otherwise enable the television tuning device to access the EPG information from the EPG provider to which the loader program 502 corresponds. For example, the user may have to enter in a credit card number and/or an authentication code so that the user properly subscribes to a service in which the EPG information from the EPG provider can be accessed by the user's television tuning device. As another example, the user interface may provide the user with the alternative to run the data loader program 502 from the card 204 itself, or load (transfer) the program 502 into the device such that the program 502 runs from the device (and such that the card 204 is then removable from the device). In general, the user interface provides user interaction for loading of the data loader program 502 from the hardware card 204 into the television tuning device 102.

Figure 6:
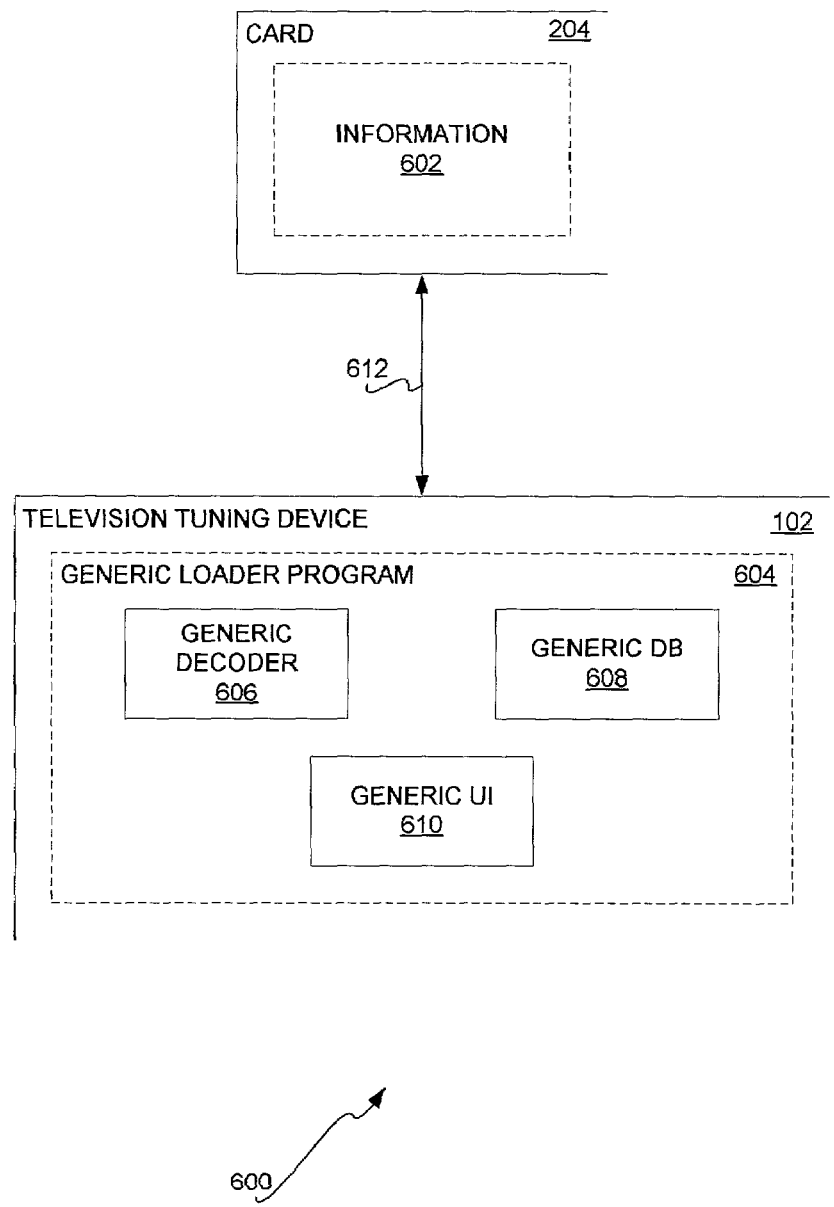
FIG. 6 is a diagram of a system showing what is stored on a hardware card in another embodiment of the invention.

Alternatively, the card 204 does not store any executable code. Rather, the card 204 only stores the information necessary to access the EPG information from an EPG provider. This is shown in the diagram 600 of FIG. 6. The card 204 only includes non-executable information 602, which corresponds to a particular EPG provider. For example, the information 602 may include the specification of the transmission network over which the encoded EPG information is received from the provider. The information may also include the manner by which the encoded EPG information is decoded. The television tuning device 102, such as a set-top box, in which the card 204 is inserted, as represented by the arrow 612, in this case includes a generic loader program 604, to load the information 602 stored on the card 204 into the device 102. As before, the information 602 can be loaded and stored within the device 102, so that the card 204 can be subsequently removed, or the card 204 may be required to be inserted into the device 102 at all times.

The generic loader program 604 includes one or more of three program segments: a generic decoder segment 606, a generic database segment 608, and a generic user interface segment 610. The decoder segment 606 uses the information 602 stored on the card 204 to decode the encoded EPG information. The decoder segment 606 also uses the information 602 to determine where to access the encoded EPG information. The database segment 608 is used to transfer the information 602 into the television tuning device 102, so that the card 204 can be subsequently removed. Finally, the user interface segment 508 provides displayed instructions to the user as to what he or she must do to load the information 602 into the device 102, or otherwise enable the television tuning device to access the EPG information from the EPG provider to which the information 602 corresponds. The segments 606, 608, and 610, as well as the loader program 604, are generic in that they are not particular to any particular hardware card 204.

Method

In this section of the detailed description, a method according to an embodiment of the invention is described. The method can in some embodiments be at least in part computer-implemented. A computer-implemented method is desirably realized at least in part as one or more programs running on a computer that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer. The invention is not so limited, however.

Figure 4:
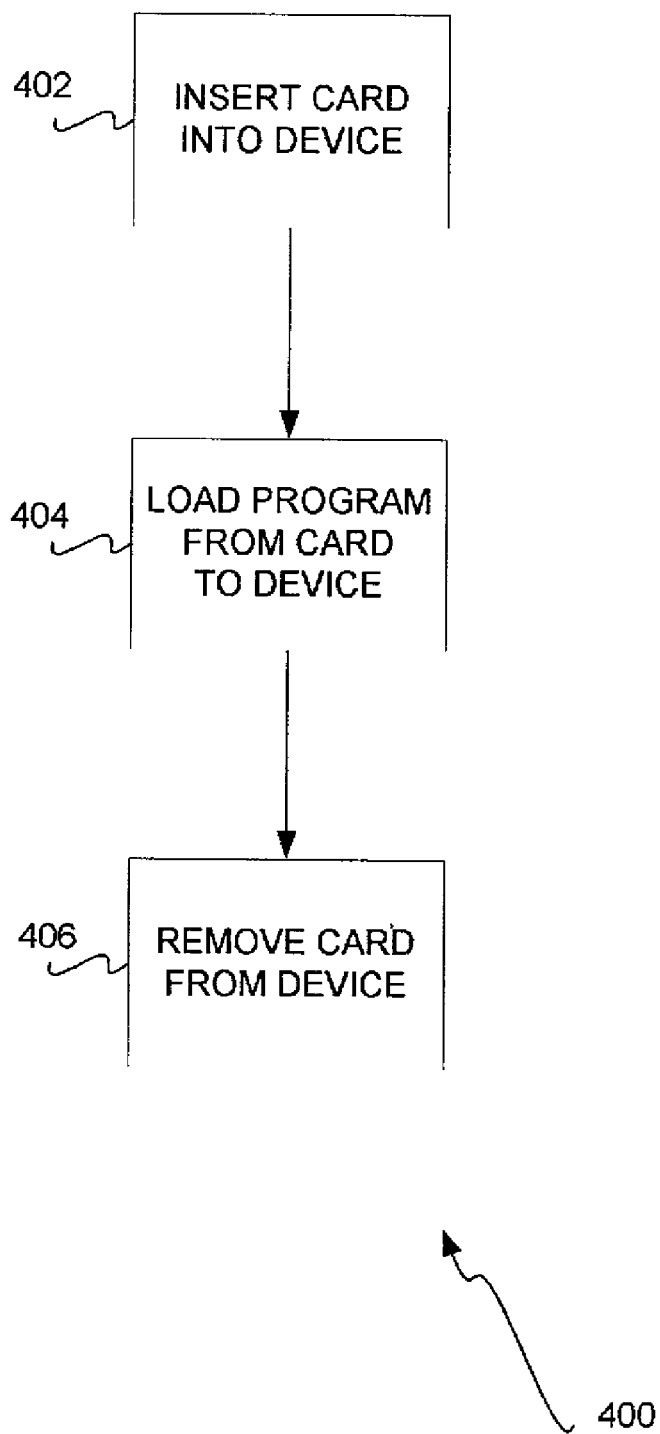
FIG. 4 is a flowchart of a method according to an embodiment of the invention.

Referring to FIG. 4, a flowchart of a method 400 according to an embodiment of the invention is shown. In 402, a user inserts an EPG data loader hardware card into a corresponding slot television tuning device communicatively coupled to a display such as a TV or a computer monitor. In 404, one or more data loader programs corresponding to one or more EPG providers are loaded or transferred into the television tuning device. For example, the programs can include the program 502 of FIG. 5. Such loading enables the television tuning device to receive EPG information from the EPG providers over specified network(s), as has been described in previous sections of the detailed description. Alternatively, in 404, only information that has been stored on the card is accessed or loaded into the television tuning device. For example, the information may be the information 602 of FIG. 6. Generally, the loading of programs and the accessing or decoding of the non-executable information from the card is referred to as accessing the data stored on the card. Finally, in 406, the user removes the hardware card from the slot of the television tuning device, although in some embodiments, removal is not necessary and/or not permitted.

Business Model

The invention results in a new business model for the selling of EPG cards to consumers. This is described by reference to FIG. 7, which is a flowchart of a method 700 according to an embodiment of the invention. In 702, a consumer purchases or otherwise receives a television-tuning device, such as a set-top box. The consumer may purchase the device from a retailer, or may receive it for a discounted price, or free, from his or her television provider. The television provider may be, for example, a local cable company, a satellite television provider, or another type of television provider. The device may include a standard EPG card. Alternatively, the device may not come with any EPG card.

If the card is not included with the device, then the method 700 proceeds from 704 to 706, where the consumer purchases one or more EPG cards. A given retailer or television provider, for example, may have a wide variety of different EPG cards from which the consumer can select and purchase one or more cards. Different EPG cards may correspond to different EPG providers, different levels of quality of the EPG's, different price points, different types of EPG's, as well as other distinctions. For example, one EPG card may have better movie listings than another card, which may have better sports information. Even if the device comes with an EPG card, such that the method 700 proceeds from 704 to 708, the consumer may still desire to purchase addition cards. In such a case, the method 700 proceeds from 708 to 706.

The card may be consumer- or merchant-loadable into the consumer's television tuning device. When the consumer purchases the EPG card, he or she may only be purchasing in actuality the loading of the information from the EPG card into his or her device. Alternatively, the consumer may be purchasing the physical card itself. In the former situation, the merchant, such as a retailer or a television provider, loads the information from the card into the consumer's device, and the method 700 proceeds from 710 to 712. In the latter situation, the consumer loads the information from the card into his or her own device, and the method 700 proceeds from 710 to 714. In the case of 712, the card must be of the type that can be subsequently removed from the device after it is inserted, or otherwise the consumer would have to take possession of the card. In the case of 714, the card can either by of the type that must remain in the device after insertion, or that can be removed after insertion.

Figure 7:
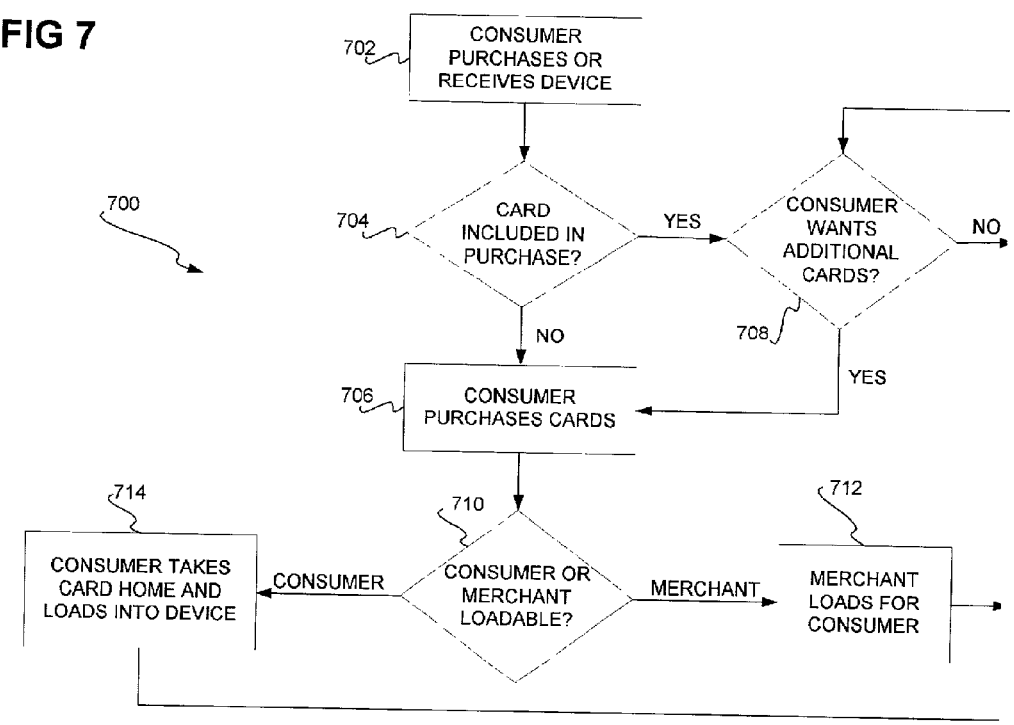
FIG. 7 is a flowchart of a method of doing business according to an embodiment of the invention.

From either 712 or 714, the method 700 proceeds to 708. When or if the user desires to purchase additional EPG cards, the method 700 then proceeds to 706 as has been described. The method 700 of FIG. 7 describes a market for EPG cards. The cards may be included or not be included with the purchase or providing of the television tuning device. A given merchant may have different types of cards for purchase, at different price points. The method 700 of FIG. 7 is thus advantageous in at least two ways. First, it enables EPG providers to compete for customers. Second, it gives customers some choices as to which EPG providers they wish to purchase cards from, regardless of the type of television tuning device they own.

Server-Based Embodiment

Figure 8:
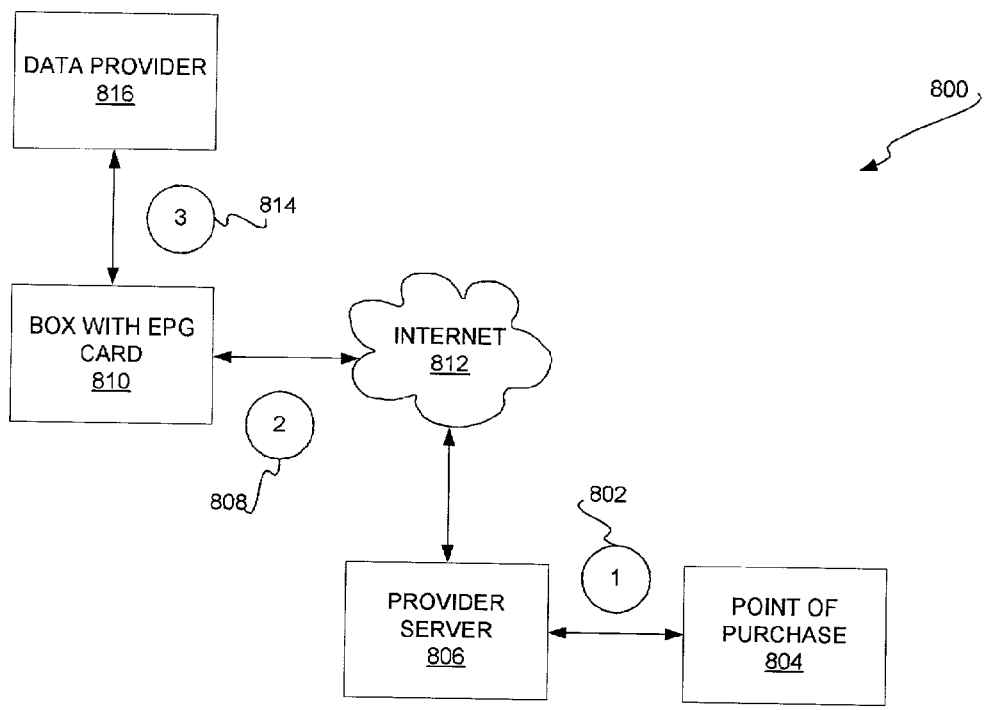
FIG. 8 is a diagram of a system of a server-based embodiment of the invention.

FIG. 8 is a diagram 800 showing a server-based embodiment of the invention. At the point of purchase 804, a retail clerk registers the purchased EPG card with a provider server 806. This is indicated by the circle 802. The clerk can accomplish this by indicating with the provider server 806 the serial number of the EPG card, as well as one or more codes indicating the type of programming that the consumer purchased. For example, the retail clerk may use an automated telephone system to enter in the serial number and the programming codes via the keys of a telephone.

The consumer then inserts the EPG card into the set-top box, such that there is a set-top box with an inserted EPG card 810. The EPG card includes location information as to how to connect to the provider server 806, such as over the Internet 812. The provider server 806, for instance, may have a Universal Resource Locator (URL) address for access through the Internet 812. The box 810 uses this information to access the provider server 806, which then indicates to the box 810 how to access the programming listings that the consumer paid for at the point of purchase 804. This is indicated by the circle 808.

For example, the box 810 may send to the server 806 the serial number of the EPG card previously purchased, and which has been inserted into the box 810. The server 806 looks up the type of programming information that has been purchased, and which is associated with this serial number, and provides this information back to the box 810. Along with this information, the server 806 also can provide where and how to receive this information, such as from the data provider 816. The box 810 is then able to download the programming listings, as has previously been described, from the data provider 816, as indicated by the circle 814.

The advantage of this embodiment is that the EPG card does not have to transfer loader program information into the box 810. Rather, the EPG card stores a serial number, or other identification information, which is used by the server 806 to look up the type of programming information that has been purchased by the consumer. Note that the calling up of the provider server 806 at the point of purchase 804 as indicated by the circle 802 is optional. For example, given EPG cards with given identification information may have previously been assigned to various types of programming with the provider server 806. In this instance, the consumer only has to purchase a desired type of EPG card, and insert it into the set-top box 810. The set-top box 810 sends the identification information to the provider server 806, which then sends the set-top box 810 the type of programming information that has been purchased with the EPG card. In either embodiment, the card is removable once the box 810 has received where and how to download the programming listing information.

FIG. 9 is a flowchart of a method 900 illustrating the server-based embodiment. In 902, the EPG card is optionally registered at the point of purchase with the provider server. The EPG card is then inserted into the set-top box in 904, which causes identification information associated with the EPG card to be sent to the provider server in 906. The server returns to the set-top box in 908 information as to how and where to receive the EPG information associated with the identification information of the EPG card. This EPG information is then received accordingly by the set-top box in 910. The EPG card may optionally be removed in 912 any time after performance of 908.

CONCLUSION

It is noted that, although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. Therefore, it is manifestly intended that this invention be limited only by the claims and equivalents thereof.

The invention claimed is:

1. A hardware card for insertion into a television tuning device having electronic program guide capability, the hardware card configured to enable the television tuning device to compatibly process encoded electronic program guide information, the encoded electronic program guide information being encoded to prevent use of the electronic program guide information at the television tuning device until the electronic program guide information has been purchased, comprising:

a case having a form factor;

a non-volatile memory situated within the case and having loadable data stored thereon that can be loaded onto the television tuning device, portions of the loadable data comprising a specification specifying settings for accessing a purchased portion of electronic program guide information over a corresponding transmission network along with settings for compatibly processing the purchased portion of encoded electronic program guide information, the loadable data including:

an indication of a communication mechanism for communicating with the specified electronic program guide provider via the corresponding transmission network; and additional distinguishing information distinguishing the purchased portion of electronic programming guide information from other electronic programming guide information maintained by the specified electronic program guide provider; and means for providing the loadable data to the television tuning device, for configuring the television tuning device to connect to the specified electronic program guide provider over the corresponding transmission network, for configuring the television tuning device to decode the purchased portion of electronic program guide information and for transferring the additional distinguishing information to the specified electronic program guide provider; and wherein the specified electronic program guide provider, upon being connected to by the television tuning device via the indicated communication mechanism, uses the additional distinguishing information to identify the purchased portion of electronic program guide information from among other electronic program guide information maintained at the specified electronic program guide provider, and thereafter enables the television tuning device to access the purchased portion of electronic program guides information.

2. The hardware card of claim 1, wherein the loadable data represents one or more loader programs for the television tuning device, each loader program corresponding to an electronic program guide provider.

3. The hardware card of claim 2, wherein each loader program includes specification of a transmission network over which encoded electronic program guide information is received from the electronic program guide provider to which the loader program corresponds.

4. The hardware card of claim 3, wherein the transmission network comprises at least one of: a dial-up modem, Ethernet, in-band, out-of-band, vertical-blanking interrupt (VBI).

5. The hardware card of claim 2, wherein each loader program includes a database segment to transfer the loader program into the television tuning device.

6. The hardware card of claim 2, wherein each loader program includes a segment to provide a user interface.

7. The hardware card of claim 1, wherein the loadable data represents non-executable information decodable by the television tuning device to access electronic program guide information from an electronic program guide provider.

8. The hardware card of claim 7, wherein the non-executable information is decodable by a decoder segment of the television tuning device.

9. The hardware card of claim 1, wherein the non-volatile memory comprises flash memory.

10. The hardware card of claim 1, wherein the television tuning device comprises a set-top box.

11. The hardware card of claim 1, wherein the form factor comprises one of: a Smart Card form factor, a Compact Flash form factor, and a Smart Media form factor.

12. A hardware card as recited in claim 1, wherein the hardware card further includes information specifying to a user what the user must do to load, to the television tuning device, the data that enables the television tuning device to access the one or more electronic program guides.

13. A hardware card as recited in claim 12, wherein the information specifies that the user must enter at least one of a credit card number and an authentication code.

14. A method as recited in claim 1, wherein the server enables the television tuning device to access the one or more electronic program guides by providing the one or more electronic program guides to the tuning device.

15. The method as recited in claim 1, wherein the additional distinguishing information indicates a level of quality of the purchased portion of electronic program guide information.

16. A television tuning system comprising:

a television tuning device including:

an outer case having a slot to accept a hardware card;

internal components hard-coded to a particular electronic program guide provider; and other internal components configured to receive information loaded into the television tuning device from a hardware card inserted into the slot to allow for reception of electronic program guide information from other electronic program guide providers in addition to the particular electronic program guide provider hard coded into the internal components;

a hardware card configured to enable the television tuning device to compatibly process electronic program guide information, the electronic program guide information being encoded to prevent use of the electronic program guide information at the television tuning device until the electronic program guide information has been purchased, the hardware card including:

a case having acceptable form factor for insertion into the slot;

a non-volatile memory situated within the case and having loadable data stored thereon that can be loaded onto the television tuning device, portions of the loadable data comprising a specification specifying settings for accessing a purchased portion of electronic program guide information over a corresponding transmission network along with settings for compatibly processing the purchased portion of encoded electronic program guide information, the loadable data including:

an indication of a communication mechanism for communicating with the specified electronic program guide provider via the corresponding transmission network; and additional distinguishing information distinguishing the purchased portion of electronic programming guide information from other electronic programming guide information maintained by the specified electronic program guide provider: and a storage locations storing an electronic program guide loader program corresponding to the electronic program guide provider, the stored electronic program guide loader program designed to access loadable information stored on the hardware card to configure the television tuning device to access the purchased portion of electronic program guide information from the electronic program guide provider, the stored electronic program guide loader program including:

an EPG decoding segment configured to use the loadable information to decode the purchased portion of electronic program guide information received from the specified electronic program guide provider via the corresponding transmission network;

a database segment configured to transfer the loadable data for the electronic program guide provider into the other internal components; and a user interface segment configured to displays instructions corresponding to what a user must do to load the loadable data for the electronic program guide provider onto the television tuning device and to enable the television tuning device to access the purchased portion of electronic program guide information from the electronic program guide provider over the corresponding transmission network;

means for switching to the specified electronic program provider to access the purchased portion of electronic program guide information in accordance with and in response to accessing the loadable information stored on the hardware card; and one or more connections within the outer case to communicatively couple the television tuning device to a display.

17. The device of claim 16, wherein the form factor comprises one of: a Smart Card form factor, a Compact Flash form factor, and a Smart Media form factor.

18. The device of claim 16, wherein the hardware card has a non-volatile memory on which non-executable information is stored that is decodable by a decoder segment of the television tuning device, the non-executable information, when decoded by the decoder segment, providing the device with the capability to receive the electronic program guide information.

19. A method comprising:

accepting an inserted hardware card into a slot of a television tuning device communicatively coupled to a display; and, accessing data stored on the hardware card to enable the device to receive a purchased portion of electronic program guide information, from an electronic program guide provider, wherein the purchased portion of electronic program guide information is different than other electronic program guide information that the television tuning device was hard-coded to receive, such that accessing the data stored on the hardware card effectively enables the television tuning device to change electronic program guide information received at the television tuning device;

wherein the data of the hardware card includes:

portions of loadable data comprising a specification specifying settings for accessing the purchased portion of encoded electronic program guide information over a corresponding transmission network along with settings for compatibly processing the purchased portion of encoded electronic program guide information, the loadable data including:

an indication of a communication mechanism for communicating with the specified electronic program guide provider via the corresponding transmission network; and additional distinguishing information distinguishing the purchased portion of encoded electronic programming guide information from other electronic programming guide information maintained by the specified electronic program guide provider;

an EPG decoding segment for the specified electronic program guide provider, wherein the EPG decoding segment includes means for decoding the purchased portion of encoded EPG information obtained from the specified electronic program guide provider via the corresponding transmission network;

a database segment having means for enabling transfer of the data from the hardware card onto the television tuning device such that the television tuning device can decode the purchased portion of encoded electronic program guide information received via the transmission network; and a user interface segment which displays instructions corresponding to what a user must do to load the data one the television tuning device and to enable the television tuning device to access the purchased portion of electronic program guide information via the corresponding transmission network; and switching to the purchased electronic program guide information in accordance with and in response to accessing the data stored on the hardware card to override the display of existing electronic program guide information.

20. The method of claim 19, wherein accessing the data stored on the hardware card includes loading the data from the hardware card into the television tuning device.

21. A method as recited in claim 20, wherein each of the said electronic program guide provider and the said another electronic program guide provider encode the electronic program guide information differently.

22. A method as recited in claim 20, wherein each of the said electronic program guide provider and the said another electronic program guide provider encode the electronic program guide information differently.

23. The method of claim 19, further comprising removing the hardware card from the slot of the television tuning device.

24. A method as recited in claim 19, wherein the type of electronic program guide information corresponds to a type of quality.

25. A method as recited in claim 19, further including:

a server, upon being connected to by the television tuning device, using identification information obtained from the hardware card to determine a type of programming information that has been purchased by a consumer of the card, and that thereafter provides the one or more electronic program guides to the television tuning device.

26. A method of doing business comprising:

offering a consumer one or more electronic program guide hardware cards for purchase, the cards able to be inserted into a corresponding slot of a television tuning device used by the consumer, each card enabling the television tuning device to switch access from a first electronic program guide provider that the television tuning device is programmed to access for obtaining electronic program guide information to a purchased portion of electronic program guide information from a different electronic program guide provider to obtain different electronic program guide information;

purchasing, by the consumer, an electronic program guide hardware card for desired electronic program guide information; and, loading the electronic program guide hardware card into the television tuning device, wherein loading the electronic program guide hardware card causes the television tuning device to access the purchased portion of electronic program guide information in accordance with and in response to data stored in the purchased electronic program guide hardware card;

wherein the data stored in the electronic program guide hardware card includes:
portions of loadable data comprising a specification specifying settings for accessing the purchased portion of electronic program guide information over a corresponding transmission network along with settings for compatibly processing the purchased portion of electronic program guide information, the loadable data including:
an indication of a communication mechanism for communicating with the specified electronic program guide provider via the corresponding transmission network; and
additional distinguishing information distinguishing the purchased portion of electronic programming guide information from other electronic programming guide information maintained by the specified electronic program guide provider;
an EPG decoding segment the specified electronic program guide providers, wherein the EPG decoding segment includes means for decoding he purchased portion electronic program guide information obtained from the specified electronic program guide provider via the corresponding transmission network;
a database segment having means for enabling transfer of the data onto the television tuning device such that the television tuning device can decode the purchased portion of electronic program guide information received via the corresponding transmission network; and
a user interface segment which displays instructions corresponding to what a user must do to load the data one the television tuning device and to enable the television tuning device to access the purchased portion of electronic program guide information via the corresponding transmission network.

27. The method of claim 26, wherein loading the electronic program guide hardware card into the television tuning device is performed by the consumer.

28. The method of claim 26, wherein loading the electronic program guide hardware card into the television tuning device is performed by a merchant.

29. A method as recited in claim 26, wherein the first electronic program guide provider supplied the television tuning device to the consumer.

30. The method of claim 26, further initially comprising receiving of the television tuning device by the consumer.

31. The method of claim 30, wherein receiving of the television tuning device by the consumer includes purchasing of the television tuning device by the consumer.

32. The method of claim 30, wherein receiving of the television tuning device by the consumer includes providing of the television tuning device by a merchant to the consumer free-of-charge to the consumer.

33. The method of claim 30, wherein receiving of the television tuning device by the consumer includes receiving by the consumer of an electronic program guide hardware card along with the television tuning device.

34. The method of claim 30, further comprising accessing a provider server by the television tuning device to receive the different electronic program guide information associated with the electronic program guide hardware card inserted into the television tuning device.

35. The method of claim 30, further comprising, as part of the purchasing by the consumer of the electronic program guide hardware card, registering the hardware card with a provider server to indicate the different electronic program guide information associated with the electronic program guide hardware card.

* * * * *